United States Patent [19]

Kimura et al.

[11]  4,445,584

[45]  May 1, 1984

[54] MOTOR VEHICLE EQUIPPED WITH ENGINE NOISE EMISSION PREVENTING DEVICE

[75] Inventors: Akira Kimura, Kawasaki; Masao Ishihama; Yoshikazu Hayakawa, both of Yokosuka, all of Japan

[73] Assignee: Nissan Motor Co., Ltd., Yokohama, Japan

[21] Appl. No.: 300,061

[22] Filed: Sep. 8, 1981

[30] Foreign Application Priority Data

Apr. 12, 1978 [JP] Japan ................................ 53-42074

[51] Int. Cl.³ .............................................. B60K 11/04
[52] U.S. Cl. ................................. 180/69.22; 180/69.1;
181/204; 296/39 A
[58] Field of Search .................... 180/54 A, 299, 54 R, 180/69.1; 296/204, 35.1, 35.2, 38, 39 R, 39 A; 181/203, 207, 243, 282, 204

[56]  References Cited

U.S. PATENT DOCUMENTS

| 2,820,523 | 1/1958  | Earl .............................. 180/54 A X |
| 3,147,814 | 9/1964  | Suhre ............................. 180/54 A   |
| 3,205,964 | 9/1965  | Henry-Biabaud ................ 180/54 A   |
| 3,882,951 | 5/1975  | Conley ........................... 180/54 A X |
| 3,903,831 | 9/1975  | Bartlett et al. .................. 180/54 A X |
| 3,923,114 | 12/1975 | Suzuki ............................ 180/68.1   |
| 3,990,737 | 11/1976 | Palmer ........................... 296/35.1    |
| 4,020,900 | 5/1977  | Kitagawa ........................ 180/68.1 X  |
| 4,060,142 | 11/1977 | Abe ................................ 180/54 A   |
| 4,116,269 | 9/1978  | Ikeda ............................. 180/54 A X |

FOREIGN PATENT DOCUMENTS

| 7107748 | 3/1972  | Fed. Rep. of Germany . |
| 2620774 | 12/1976 | Fed. Rep. of Germany . |
| 995996  | 6/1965  | United Kingdom . |
| 1499140 | 1/1978  | United Kingdom . |
| 1512128 | 5/1978  | United Kingdom . |
| 1528044 | 10/1978 | United Kingdom . |
| 1546836 | 5/1979  | United Kingdom . |

*Primary Examiner*—Joseph F. Peters, Jr.
*Assistant Examiner*—Michael Mar
*Attorney, Agent, or Firm*—Schwartz, Jeffery, Schwaab, Mack, Blumenthal & Koch

[57]  ABSTRACT

A motor vehicle comprising a power unit including an internal combustion engine, a radiator and a transmission, a sound insulating cover located below the power unit, and connecting plate members which securely connect the sound insulating cover to the body of the motor vehicle, thereby forming a noise insulating duct in which the engine is located, so that the engine noise is effectively prevented from being directly emitted outside the vehicle.

15 Claims, 12 Drawing Figures

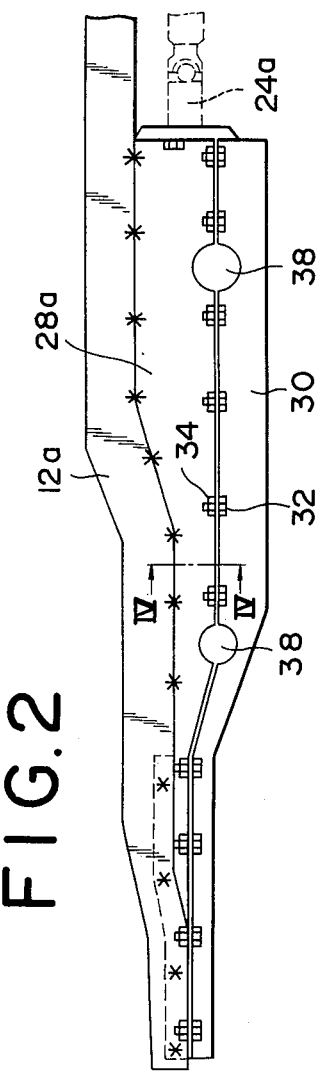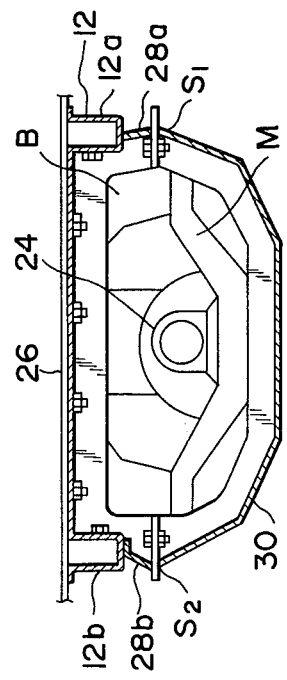
FIG.2
FIG.3

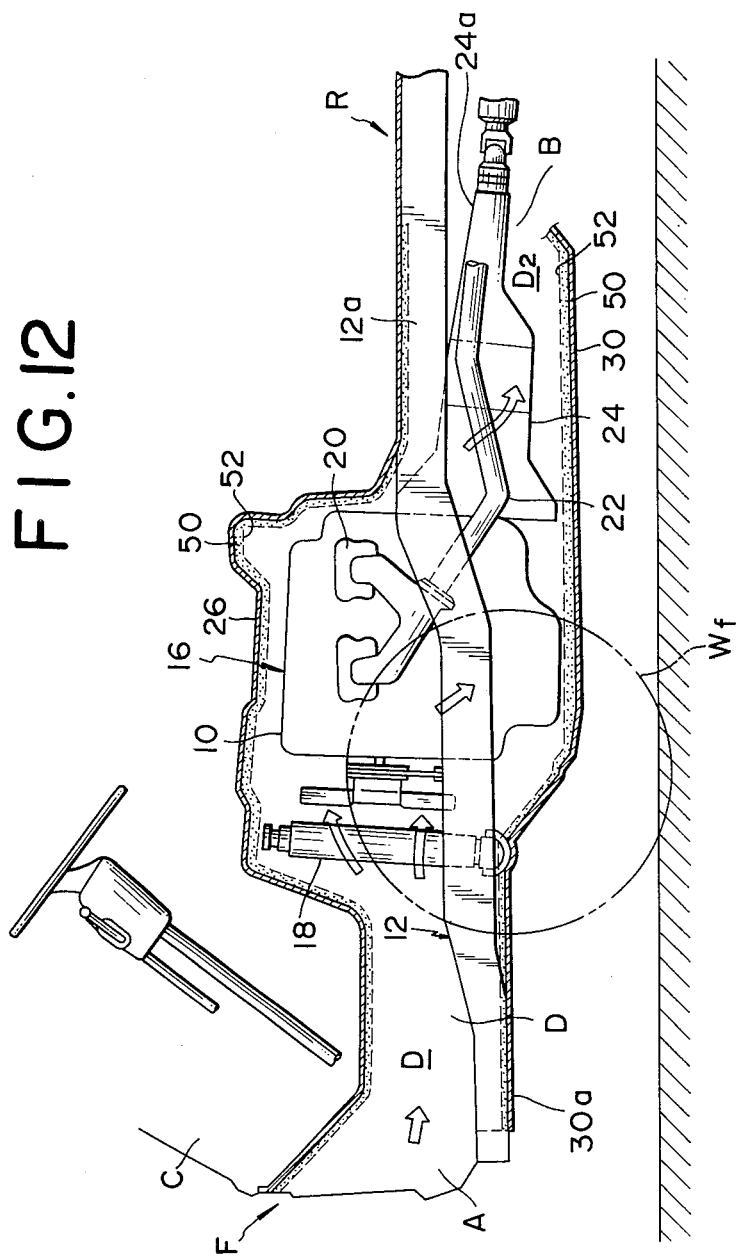

MOTOR VEHICLE EQUIPPED WITH ENGINE NOISE EMISSION PREVENTING DEVICE

RELATED APPLICATION

This application is a continuation-in part-application of applicant's pending U.S. patent application Ser. No. 28,938, filed on Apr. 11, 1979 now abandoned.

BACKGROUND OF THE INVENTION

1. Field of the Invention

This invention relates to an improved in a motor vehicle to reduce the noise level thereof, and more particularly to a noise emission preventing device for use in an automotive vehicle, by which the engine noise is effectively prevented from being emitted outside the vehicle.

2. Description of the Prior Art

In a technique of preventing engine noise emission from a motor vehicle, there has been conventionally used an enclosure type engine noise insulating device wherein the engine is enclosed substantially in a sealed condition by means of a noise insulating plate. Such a conventional insulating device, though it has a considerable insulating effect, is defective in that the structure is too complicated, requires a large number of parts and is inferior with regard to ease and frequency of maintenance. There is also a problem with regard to the internal thermal load with respect to the cooling of the engine, which requires a separate means for reducing the thermal load. Further, as the noise insulating plate is supported by the engine body, the vibration (particularly the low frequency component) of the engine body is transmitted to the noise insulating plate, even though an elastic support manner is employed. The noise insulating plate will therefore become a second noise source and consequently weaken the noise insulating effect. Accordingly, such a conventional device does not meet desired requirements and thus is difficult to be put to practical use.

SUMMARY OF THE INVENTION

The present invention overcomes the drawbacks encountered in the conventional motor vehicle equipped with an engine noise insulating device, by forming an engine noise insulating duct in which the internal combustion engine is disposed in order to prevent the engine noise from being directly emitted outside the vehicle.

It is the main object of the present invention to provide an improved motor vehicle in which the engine noise is effectively prevented from being emitted outside the vehicle, solving the problems raised in a conventional engine noise emission preventing device of a motor vehicle.

Another object of the present invention is to provide a motor vehicle provided with an improved engine noise emission preventing device which is excellent in preventing engine noise from being emitted both in the lateral and fore-and-aft directions of the vehicle.

A still another object of the present invention to provide a motor vehicle provided with an improved engine noise emission preventing device whose constituent members are not directly contact with an engine body, and accordingly, the vibration of the engine cannot be transmitted to the device, thereby preventing constituent members of the preventing device from becoming a second noise source.

A further object of the present invention is to provide an automotive vehicle provided with an improved engine noise emission preventing device which does not degrade the cooling effect to the engine since cooling air flows smoothly through the engine noise emission preventing device in which the engine lies.

A still further object of the present invention to provide an automotive vehicle provided with an improved engine noise preventing device which is simple in construction and accordingly easy in assembly and maintenance thereof.

BRIEF DESCRIPTION OF THE DRAWINGS

Other objects, features and advantages of the improved motor vehicle according to the present invention will become more apparent from the following description taken in conjunction with the accompanying drawings in which like reference numerals are assigned to the corresponding parts and elements throughout all figures, in which:

FIG. 2 is a side elevation showing constituent members of an engine noise insulating duct in which an engine is disposed;

FIG. 3 is a cross-sectional view taken in the direction of arrows substantially along the line III—III of FIG. 1;

FIG. 12 is a schematic cross-sectional view of the essential part of another preferred embodiment of a motor vehicle in accordance with present invention.

DESCRIPTION OF THE PREFERRED EMBODIMENTS

Figure 1:
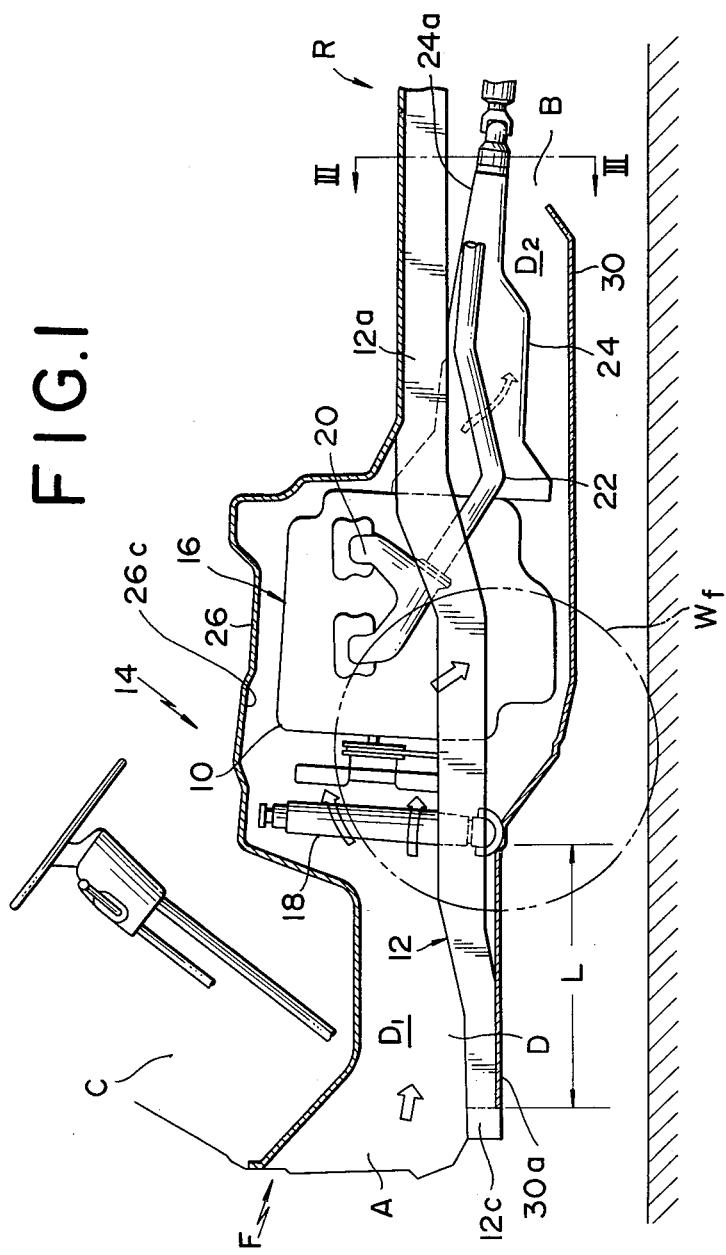
FIG. 1 is a schematic cross-sectional view of an essential part of a preferred embodiment of a motor vehicle in accordance with the present invention.
Figure 4:
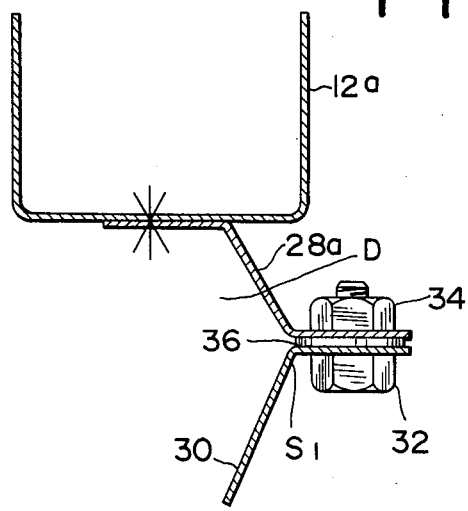
FIG. 4 is a cross-sectional view taken along in the direction of arrows substantially taken along the line IV—IV of FIG. 2, showing an example of connection between a support plate member and a sound insulating cover forming part of the noise insulating duct of FIG. 1.

Referring now to FIGS. 1 to 5 inclusive of the drawings, there is shown a preferred embodiment of a motor vehicle (no numeral) in accordance with the present invention. The motor vehicle of this case is an automotive truck of the cab-over-engine type wherein a vehicle cabin C or driver's compartment lies over an internal combustion engine 10. The engine 1 is as usual elastically supported by the frame 12 or chassis of vehicle body 14. The frame 12 includes two rigid elongate members 12a, 12b which extend oppositely and in parallel with the longitudinal axis (not shown) of the vehicle. Accordingly, the elongate members 12a, 12b extend from the front portion or panel F of the vehicle toward the rear portion R of the vehicle. As will be understood, the engine 10 forms part of a power unit 16 for generating power to operate the vehicle. A radiator 18 for cooling engine coolant is located slightly forward of the engine 10 and fluidly connected to the engine though not shown. The engine 10 is provided with an exhaust manifold 20 which is followed by an exhaust pipe 22 to discharge exhaust gases from the engine into ambient air. A transmission 24 is located rearward of the engine 10 and so mechanically connected to the engine that the main shaft (not shown) of the transmission 24 is aligned with the crankshaft (not shown) of the engine 10. The vehicle cabin C is defined on a floor portion 26 or lower wall member forming part of the vehicle body 14. The floor portion 26 extents to the front panel F. As shown, the engine 10 is located below the floor portion 26. The reference character $W_f$ represents one of front wheels of the vehicle.

Two support or connecting plate members 28a, 28b are securely connected to the elongate members 12a, 12b, respectively, by means of welding indicated by marks of ✻, or bolts (not shown). The support plate members 28a, 28b have the function of providing sound insulation to prevent the engine noises from being emitted outside thereof.

A sound insulating cover 30 is formed with two side sections $S_1$ and $S_2$ which are opposite to each other and extend in parallel with the elongate members 12a, 12b. Each of sections $S_1$ and $S_2$ is provided with a flange portion (no numeral) which is secured to the flange portion (no numeral) of each of the two support plate members 28a and 28b by means of bolts 32 and nuts 34, as clearly viewed in FIG. 4 which shows an example of the connection between the support plate member 28a, 28b and the sound insulating cover 30. It is to be noted that a sealing member 36 such as a packing is interposed between the two flange portions of the support plate member 28a or 28b and the flange portion of the side section $S_1$ or $S_2$ of the sound insulating cover 30. The sound insulating cover 30 extends from the vehicle front portion F adjacent the front end of the vehicle to the rear portion of the vehicle adjacent the rear end 24a of the transmission 24. As viewed in the drawings, a noise insulating duct D is formed by the floor portion 26, the frame 12, the support plate members 28a, 28b and the sound insulating cover 30 in order to enclose therein the engine 10. The noise insulating duct D is formed with a forward opening A which is located at the vehicle front portion F and a rearward opening B which is located adjacent the rear end 24a of the transmission 24 to be opened toward the vehicle rear portion R.

Figure 6:
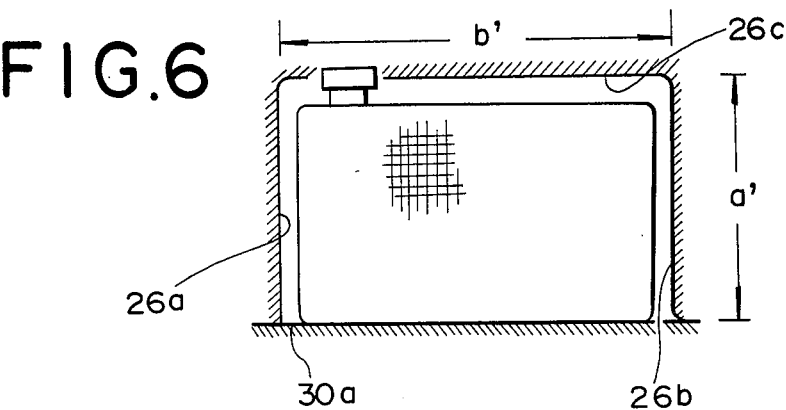
FIG. 6 is a schematic representation showing the relationship between a radiator and a lower wall member of a vehicle body.

As shown in FIG. 6, the lower wall member 26 includes generally vertical opposite side wall sections 26a, 26b which defines therebetween a tunnel-like space (no numeral) in cooperation with a upper wall section 26c. The radiator 18 is securely disposed within the tunnel-like space in such a manner that the flat surface thereof is generally parallel with the outer surface of the vehicle front portion F so that the air flow or vehicle cruising wind can effectively strike against the flat surface of the radiator 18. The sound insulating cover 30 extends away from the radiator 18 in the vehicle forward direction by a length L great enough to be effective for reducing the power unit noise emitted from the front portion F of the vehicle. In this case, the sound insulating cover 30 extents and reaches a cross member 12c of the frame 12. Preferably, the length L of the forward extending part 30a of the noise insulating cover 30 is not less than the value of the side wall section (26a,26b) distance $b'/\pi$. The side wall section distance $b'$ is a distance between the side wall sections 26a, 26b of the lower wall member 26 in the direction of the width of the radiator 18. The reference character $a'$ in FIG. 6 denotes the height of the side wall sections 26a, 26b.

The reason why the sound insulating cover forward extending part 30a is preferably the value of the above-mentioned distance $b'/\pi$ will be theoretically discussed hereinafter with reference to FIG. 7.

Figure 7:
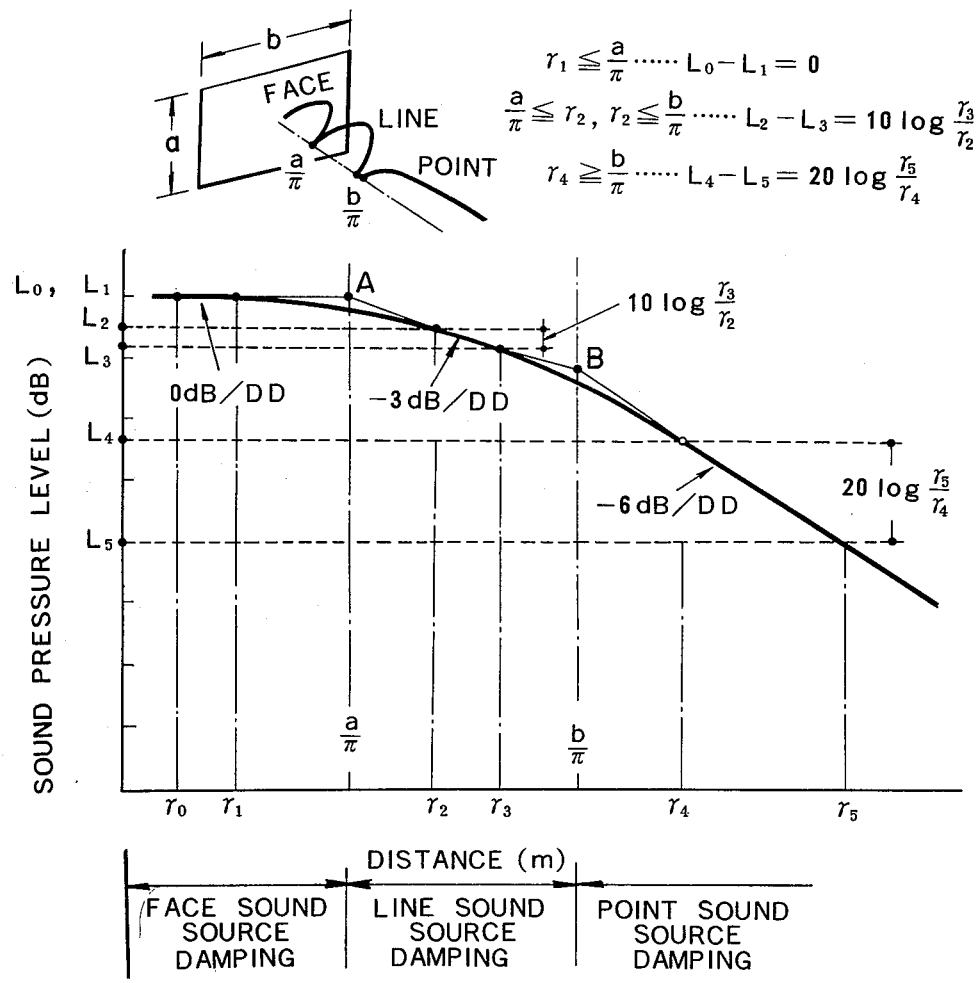
FIG. 7 is a graph theoretically illustrating the advantageous effect of the present invention.

On the assumption that there is a face sound source having an area of $F = a \times b$ ($a < b$) as shown in FIG. 7, a consideration will be made on a distance-damping (or damping due to distance-separation) in the direction of right angles with respect to the center of this face sound source. It will be understood that the distances a and b generally correspond respectively to the above-mentioned height $a'$ of each side wall section 26a, 26b of the lower wall member 26 and the distance $b'$ between the opposite side wall sections 26a, 26b. As shown in FIG. 7, (similarly in the case of a line sound source) the damping appears to be that of the face sound source in a vicinity of the face sound source, i.e., extending as far as a location $a/\pi$. However, thereafter the damping becomes that of a line sound source extending as far as the location $b/\pi$, and then it becomes that of a point sound source at a location far from the location $b/\pi$.

Accordingly, as shown in FIG. 7, a bended line is drawn such that three line segments 0 dB/DD (dB at a location of two times the distance from the face sound source), $-3$ dB/DD, and $-6$ dB/DD of the line lie respectively within three ranges which are separated from each other by vertical lines $a/\pi$ and $b/\pi$. This bended line indicates distance-damping of the face sound source such that the value of the bended line is $L_0$ (dB) at a distance $r_0$. Also in this case, the distance-damping characteristics strictly appears to become that indicated by the dark curve.

Additionally, the sound pressure levels for the distances $r_0, r_1 \ldots$ are $L_0, L_1 \ldots$ (dB), and the level at points A and B in FIG. 7 are $L_a, L_b$ (dB) in which $L_a = L_1 = L_0$.

Accordingly, $$L_1 = L_0 \text{ for } r \leq a/\pi \tag{1-1}$$

$$L_a - L_3 = 10 \log \frac{r_3}{a/\pi} = 10 \log \frac{r_3}{a} + 10 \log \pi \tag{1-2}$$

for $a/\pi \leq r \leq b/\pi$ $$\therefore L_3 = L_1 - 10 \log \frac{r_3}{a} - 5$$

wherein, $10 \log \pi \approx 5$ $$L_a - L_b = 10 \log \frac{b/\pi}{a/\pi} = 10 \log \frac{b}{a} \tag{1-3}$$

$$L_b - L_5 = 20 \log \frac{r_5}{b/\pi} = 10 \log \frac{r_5^2}{(b/\pi)^2} \text{ for } r \geq b/\pi \quad (1\text{-}4)$$

by combining equations (1-3) and (1-4), $$L_a - L_5 = 10 \log \frac{b}{a} \cdot \frac{r_5^2}{b^2/\pi^2} = 10 \log \frac{r_5^2}{ab} + 20 \log \pi \quad (1\text{-}5)$$

$$\therefore L_5 = L_1 - 10 \log \frac{r_5^2}{F} - 10$$

where F=ab.

As a result, the sound pressure level or noise level at any distance from the face sound source can be obtained. It will be understood from the above discussion, that the reduction of power unit noise emitted from the vehicle front is very effective by extending the noise indulating duct at least by a distance of $b'/\pi$.

Figure 8:
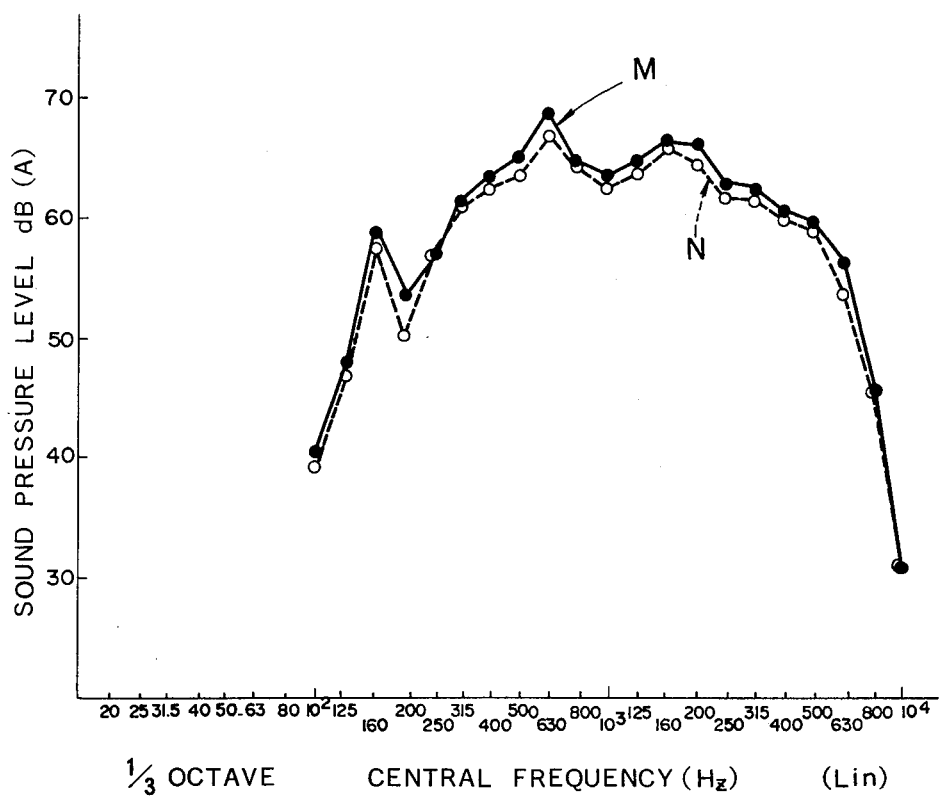
FIG. 8 is a graph showing an advantageous effect of the present invention on the comparison with a conventional technique, in terms of sound pressure level.

Besides, it is more preferable that the length L of the noise insulating cover forward extending part 30a is about the same as the above-mentioned distance b' between the opposite side wall sections 26a, 26b from the practical standpoint. Additionally, the inventors' experiments revealed that the sound insulating cover 30 having the forward extending part 30a of the length L same as the distance b' was very effective for reduction of the power unit noise emitted from the vehicle forward portion F through the noise insulating duct D, as shown in FIG. 8. In FIG. 8, a curve M indicates the sound pressure level variation on various frequencies when no sound insulating cover 30 was used, whereas a curve N indicates the sound pressure level variation on various frequencies when the sound insulating cover 30 was used. The cover has the forward extending part 30a of the same length L as the above-mentioned distance b'. As is apparent from the data of FIG. 8, the measured sound pressure levels in case of the curve N are lower by about 2 dB(A) than in the case of curve M. This shows that, by utilizing the sound insulating cover 30 having the forward extending part 30a of the above-mentioned length, the power unit noise emitted from the vehicle forward portion F is reduced to the value of about 63% relative to the noise generated from the power unit 16, thereby greatly contributing to the total vehicle noise reduction.

Figure 9:
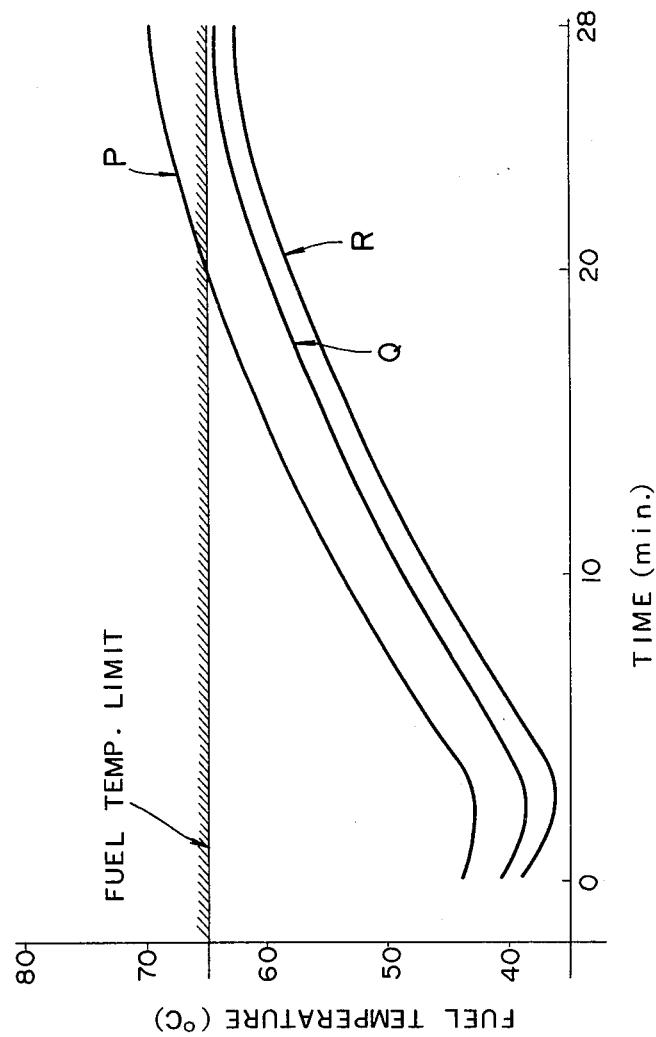
FIG. 9 is a graph showing another advantageous effect of the present invention in terms of temperature variation.

As shown, the noise insulating duct D includes forward and rearward duct sections $D_1$, $D_2$ which are located respectively forward and rearward of the engine 10 and radiator 18. It is to be noted that the minimum effective cross-sectional area of the duct opening of the rearward duct section $D_2$ is preferably not less than 50%, more preferably 70%, of that of the forward duct section $D_1$. What is meant by the minimum effective cross-sectional area is a minimum cross-sectional area of the duct opening except the cross-sectional area of members such as the transmission rear end section 24a. This relationship between the duct openings of the forward and rearward duct sections $D_1$, $D_2$ was determined on the basis of the date obtained by the inventors' experiments, as shown in FIG. 9. The data of FIG. 9 depicts the temperature variation of fuel within a float chamber of a carburetor (not shown) during so-called hot soak condition, i.e., when engine operation was completely stopped and a predetermined time elapsed, immediately after an automotive vehicle was cruising at 120 Km/hr under road-load conditions. In the graph of FIG. 9, curves P, Q and R indicate the temperature variations in cases where the minimum effective cross-sectional areas of the rearward duct section $D_2$ are 25%, 50%, and 70% of that of the forward duct section $D_1$, respectively. A fuel temperature limit means a fuel temperature above which so-called vapor lock and percolation will occur. As is apparent from the graph of FIG. 9, in case where the minimum cross-sectional area of the rearward duct section $D_2$ is less than 50% of that of the forward duct section $D_1$, the fuel temperature within the carburetor float chamber exceeds the above-mentioned fuel temperature limit during the hot soak. On the contrary, in case where the minimum effective cross-sectional area of the rearward duct section ($D_2$) opening is not less than 50% of that of the foreward duct section ($D_1$) opening, the fuel temperature within the carburetor float chamber does not reach the above-mentioned temperature limit even during the hot soak condition, which results from the fact that a sufficient air flow for engine cooling can be obtained throughout the noise reducing duct D. It is to be noted that an air stream indicated by arrows in FIG. 1 is generated in the duct D during engine operation or vehicle cruising since air is induced from the forward opening A and discharged through the rearward opening B. The reference character M (in FIG. 3) represents a cross-member for supporting the transmission 24.

With such an arrangement, the noise insulating effect is greater in the lateral direction of the vehicle and the noise can be effectively prevented from being emitted out of the vehicle. Additionally, due to the long formation of the noise insulating duct D over the range from the vicinity of the front end of the vehicle to the vicinity of the rear end portion of the transmission, the noise going round outside the vehicle is rendered minimal and the leakage of the noise which is directional forward and backward is also rendered minimal. Further, since the support plate members 28a, 28b and the sound insulating cover 30 are securely connected to the vehicle body 14, no vibration transmission from the engine 10 occurs and accordingly the sound insulating cover 30 does not serve as a secondary noise source.

Furthermore, since the noise reducing duct D extends away from the radiator 18 in the vehicle forward direction, the power unit noise can be effectively prevented from being emitted from the vehicle front portion F, which greatly contributes to the total vehicle engine noise reduction. Moreover, since the rearward duct section $D_2$ has a relatively larger area opening, smooth air flow and good engine temperature radiation can be gained, thereby preventing engine overheating and problems in the fuel system.

The cooling air for the radiator 18 and engine 10 is taken in from the forward opening A with little resistance and the air flow is effectively guided therethrough, thereby increasing the cooling ability thereof, and the hot air is exhausted out of the rearward opening B. The opening areas of the respective forward and rearward openings A, B of the noise insulating duct D and the ratio of these two areas are determined appropriately by consideration of the air amount passing through the duct D.

Figure 5:
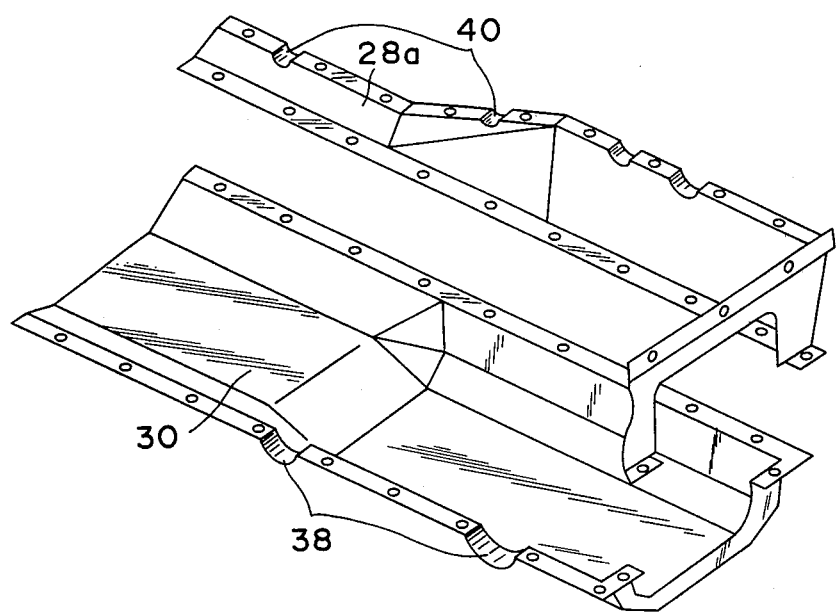
FIG. 5 is a fragmental perspective view of the support plate member and the sound insulating cover of FIG. 1.

Checking and adjustment of the engine 10, transmission 24 etc. can be easily carried out by removing the sound insulating cover 30. Through-holes 38 arranged on the noise insulating duct D shown in FIGS. 2 and 5 are provided for such parts (not shown) as installed by piercing through these holes, and if these holes 38 are provided on the jointing part of the supporting plate 28a, 28b and sound insulating cover 30, the sound insulating cover 30 can be engaged and disengaged irrespective of such piercing parts. Additionally, the piercing parts also can be easily engaged and disengaged only by removing the sound insulating cover 30, thereby saving time for adjustment and the like. Recesses 40 arranged on the support plate member 28a or 28b shown in FIG. 5, are provided to dispose therein a bracket on the lower surface of the frame 12, to secure piping and wiring, though not shown. As will be appreciated, by providing the support plate member 28a, 28b separately from the sound insulating cover 30, the engagement and disengagement of above-mentioned various accessories can be rendered much easier in maintenance of the vehicle. Furthermore, such an arrangement is advantageous from a point of view that the frame 12 is difficult to be combined directly with the sound insulating cover 30 due to its shape and that the elastic support of the sound insulating cover 30 as referred to later can also be rendered much easier.

Figure 10:
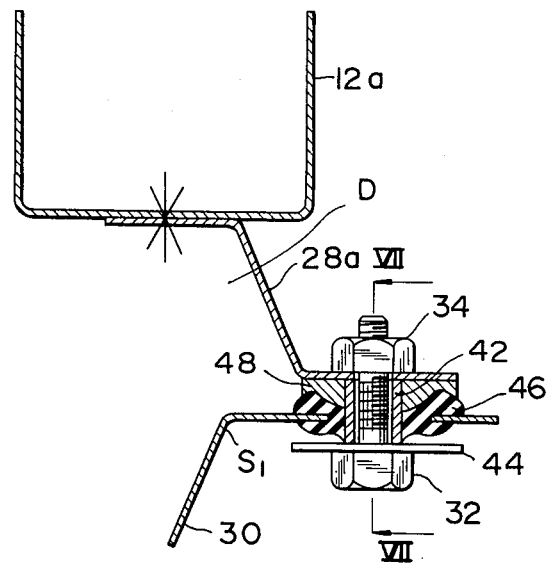
FIG. 10 is a cross-sectional view similar to FIG. 4, but showing another example of the connection between the support plate member and the sound insulating cover.
Figure 11:
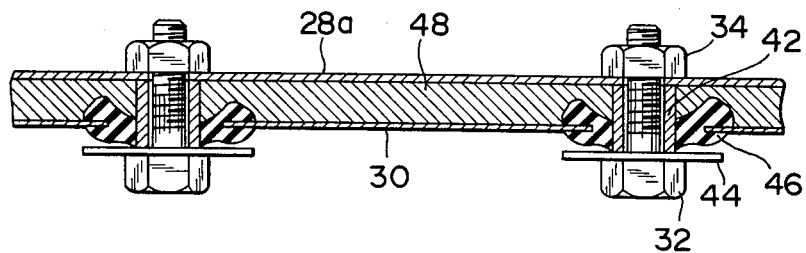
FIG. 11 is a cross-sectional view taken in the direction of arrows substantially along the line VII—VII of FIG. 6.

FIGS. 10 and 11 show another example of the connection between the support plate member 28a, 28b and the sound insulating cover 30, in which a cylindrical member or spacer 42 is disposed between the flange portion of the support plate member 28a and an annular flat washer 44 through which the bolt 32 passes, in order to maintain a certain distance between the flange portion of the support plate member 28a and the washer 44. As viewed, the bolt 32 passes through the cylindrical opening (no numeral) of the cylindrical member 42 and threaded into the nut 34 located at the opposite side of the head portion (no numeral) of the bolt 32 relative to the flange portion of the support plate member 28a. The flange portion of the sound insulating cover 30 is securely connected through an annular insulating rubber 46 on the outer surface of the cylindrical member 42. The member 42 and insulating rubber 46 forms a vibration insulating device (no numeral). It is to be noted that the flange portion of the sound insulating cover 30 does not directly contact with, the cylindrical member 42, but rather elastically contacts the cylindrical member 42 to prevent the vibration of the vehicle body from being transmitted to the sound insulating cover 30. Additionally, an elastic sound insulating seal member 48 such as a sealing sponge rubber is disposed in a space between the flange portion of the support plate member 28a and the insulating rubber 46 to prevent the noise within the noise insulating duct D from being radiated outside of the duct D.

With this arrangement, vibration of the vehicle body 14 is prevented from being transmitted to the sound insulating cover 30 and accordingly the cover 30 will never become a secondary noise source although the surface area of the sound insulating cover 30 is considerably large.

FIG. 12 illustrates another preferred embodiment of the vehicle in accordance with the present invention, which is substantially the same as the embodiment shown in FIG. 1 with the exception that a sound absorbent material 50 is attached on the inner surface of the structural members constituting the noise insulating duct D to absorb the noises generated within the duct D in which the engine 10 lies.

In this regard, by virtue of the sound absorbent material, the noise reduction can be effectively achieved as will be apparent from the following Sobine expression which was established experimentally and by which the reduction amount R is calculated:

$$R = K \cdot \frac{l}{S} \cdot L \text{ (dB)}$$

where
l: peripheral length (m)
S: sectional area (m$^2$)
L: duct length (m)
K: $3.05 \times \alpha^{1.4}$ ($\alpha$: sound absorption coefficient)

For example, when the reduction amount R is calculated on the assumption of rough estimates l=2 m, S=0.2 m$^2$, L=0.8 m in the forward duct section (D$_1$) and 0.7 m in the reaward duct section (D$_2$), and $\alpha$=0.8 with respect to f (noise frequency)=1000 HZ, the following expression can be obtained, $$R = 1.05 \times 0.8^{1.4} \times \frac{2}{0.2} \times 0.8 = 6.1 \text{ (dB)} \ldots$$

the forward duct section (D$_1$)

$$R = 1.05 \times 0.8^{1.4} \times \frac{2}{0.2} \times 0.7 = 5.4 \text{ (dB)} \ldots$$

the rearward duct section (D$_2$).

Such a significant effect has been confirmed with experiments carried out by the inventors of the present invention.

With the arrangement of FIG. 12, the noises generated by the engine 10 and the transmission 24 can be absorbed by the sound absorbent material 50 lined on the inner surface of duct D and therefore the such noises are prevented from being radiated outside the noise insulating duct D, reducing the level of the noise emitted outside the vehicle.

As viewed in FIG. 12, the surface of the sound absorbent material 50 is supported or covered with a perforated member or material 52 such as cloth, net or punched board. Otherwise, the sound absorbent material may be covered with an extremely thin heat-resistant material such as aluminium foil though not shown, by which fires caused by the oil permeation into the sound absorbent material can be effectively prevented.

While only the cab-over engine type truck has been shown and described, it will be understood that the principle of the present invention is applicable to other types of motor vehicles.

As appreciated from the foregoing, according to the present invention, sufficient noise insulating effect can be attained since the vibration of the sound insulating cover 30 is prevented, and, in addition, engine noise itself is prevented from being radiated outside the vehicle. Further, the thermal load problem can be solved, improving the cooling effect of the engine. Furthermore, assemblying and maintenance of the vehicle become much easier.

What is claimed is:
1. A motor vehicle, comprising:
a vehicle body including lower opposite side wall sections;
a power unit elastically supported by the vehicle body and including an internal combustion engine;
a radiator fluidly connected to said engine;
a transmission mechanically connected to said engine;
said radiator positioned between said lower opposite wall sections so as to be generally vertical;

a sound insulating cover located below said power unit and extending away from said radiator in the vehicle forward direction by a length (L) not less than the distance (b')/π, where (b') is the distance between said lower opposite side wall sections of said vehicle body in the direction of the width of said radiator, said sound insulating cover further extending away from said radiator in the vehicle rearward direction at least to the rearward end of said transmission, said radiator positioned rearwardly from the front of said vehicle by at least the length (L); and means for securely connecting said sound insulating cover with said vehicle body;

said vehicle body, sound insulating cover and connecting means constituting a noise insulating duct, generally longitudinal within which said radiator, said power unit and said transmission are longitudinally positioned in series so as to reduce engine noise emitted outside of the vehicle.

2. A motor vehicle as claimed in claim 1, in which said noise insulating duct (D) includes first and second sections ($D_1$, $D_2$) which are located respectively forward and rearward relative to said radiator and engine, the minimum effective cross-sectional area of the duct opening of said duct second section ($D_2$) being not less than 50% of that of said duct first section ($D_1$).

3. A motor vehicle as claimed in claim 1, further comprising means disposed between said sound insulating cover and said connecting means, for elastically and sealingly connecting said sound insulating cover and said connecting means so as to prevent the direct contact therebetween and the emission of engine noise through a connecting portion formed therebetween.

4. A motor vehicle as claimed in claim 1, in which said vehicle body includes two elongate rigid members which extend on opposite sides of the center axis of said vehicle and in parallel therewith, a floor portion extending to a front panel of said vehicle body, and a crossmember connecting said two elongate rigid members, said sound insulating cover extending to said crossmember.

5. A motor vehicle as claimed in claim 4, in which said connecting means includes two plate members which are secured to said two elongate rigid members of said vehicle body, respectively.

6. A motor vehicle as claimed in claim 5, in which said sound insulating cover is formed with two side sections ($S_1$,$S_2$) which extend along said two elongate rigid members of said vehicle body, said two side sections of said insulating cover being secured to said two plate members of said connecting means.

7. A motor vehicle as claimed in claim 6, in which each of said two plate members of said connecting means and each of said two side sections of said sound insulating cover are formed with first and second flange portions, respectively.

8. A motor vehicle as claimed in claim 7, in which said first flange portion is securely connected to said second flange portion through an insulating member for preventing the transmission of vibration and a seal member (43) for preventing emission of sound.

9. A motor vehicle as claimed in claim 8, further comprising a bolt which passes through an opening formed through the second flange portion and secured to the first flange portion with a nut, an annular washer received by the head portion of said bolt, and a cylindrical spacer disposed around said bolt and located between the first flange portion and said washer, said insulating member being disposed between the outer surface of said spacer and said second flange portion, said seal member being disposed between said insulating member and said first flange portion.

10. A motor vehicle as claimed in claim 1, further comprising a sound absorbent material attached to at least a part of the inner surface of said noise insulating duct (D).

11. A motor vehicle as claimed in claim 10, in which said sound absorbent material is attached to the surfaces of said vehicle body defining said noise insulating duct, said sound insulating cover and said connecting means.

12. A motor vehicle as claimed in claim 11, further comprising a perforated member for covering the surface of said sound absorbent material.

13. A cab-over-engine type motor vehicle, comprising:

a vehicle body including lower opposite side wall sections;

a power unit elastically supported by the vehicle body and including an internal combustion engine, a radiator fluidly connected to said engine, and a transmission mechanically connected to said engine, said radiator being so disposed between said lower opposite side wall sections so as to be generally parallel with the vertical plane of the vehicle front portion (F) and positioned rearwardly of said vehicle front portion by a length (L):

two plate members secured to said vehicle body and providing sound insulation; and a sound insulating cover located below said power unit and extending away from said radiator in the vehicle forward direction by a length (L) larger than the distance (b')/π, where (b') is the distance between said lower opposite side wall sections of said vehicle body, said sound insulating cover further extending away from said radiator in the vehicle rearward direction at least to the rearward end of said transmission, said sound insulating cover being formed with two side sections ($S_1$,$S_2$) which are detachably secured to said two plate members, respectively, by means of bolts in order to facilitate checking and maintenance of said power unit;

said vehicle body, sound insulating cover, and two plate members constituting a generally longitudinal noise insulating duct (D) within which said radiator, said power unit and said transmission are longitudinally positioned in series to reduce engine noise emitted outside of the vehicle.

14. A cab-over-engine type motor vehicle as recited in claim 13 further including vibration damping means disposed between said side sections and plate members.

15. A motor vehicle, comprising:

a vehicle body including lower opposite side wall sections;

a power unit elastically supported by the vehicle body and including an internal combustion engine;

a radiator fluidly connected to said engine;

a transmission mechanically connected to said engine;

said radiator positioned between said lower opposite wall sections so as to be generally vertical;

a second insulating cover located below said power unit and extending away from said radiator in the vehicle forward direction by a length (L) not less than the distance (b')/π, where (b') is the distance between said lower opposite side wall sections of said vehicle body in the direction of the width of said radiator, said sound insulating cover further extending away from said radiator in the vehicle rearward direction at least to the rearward end of said transmission, said radiator positioned rearwardly from the front of said vehicle by at least the length (L); and means for securely connecting said sound insulating cover with said vehicle body, said means including vibration damping means;

said vehicle body, sound insulating cover and connecting means constituting a noise insulating generally longitudinal duct within which said radiator, said power unit and said transmission are longitudinally positioned in series so as to reduce engine noise emitted outside of the vehicle.

* * * * *